United States Patent
Oh et al.

(10) Patent No.: US 10,856,039 B2
(45) Date of Patent: Dec. 1, 2020

(54) METHOD OF TRANSMITTING WIRELESS VARIABLE AV ACCORDING TO CHANNEL ENVIRONMENT

(71) Applicant: WiseJet Inc., Daejeon (KR)

(72) Inventors: InnYeal Oh, Daejeon (KR); HyeongBeom Ju, Daejeon (KR); ByeongNam Ahn, Yongin-si (KR)

(73) Assignee: WISEJET INC., Daejeon (KR)

( * ) Notice: Subject to any disclaimer, the term of this patent is extended or adjusted under 35 U.S.C. 154(b) by 0 days.

(21) Appl. No.: 16/575,884

(22) Filed: Sep. 19, 2019

(65) Prior Publication Data

US 2020/0092602 A1 Mar. 19, 2020

(30) Foreign Application Priority Data

Sep. 19, 2018 (KR) .................. 10-2018-0112230

(51) Int. Cl.
*H04N 21/4363* (2011.01)
*H04N 21/442* (2011.01)
*H04N 21/4402* (2011.01)
*H04W 24/08* (2009.01)

(52) U.S. Cl.
CPC ... *H04N 21/43637* (2013.01); *H04N 21/4402* (2013.01); *H04N 21/44227* (2013.01); *H04W 24/08* (2013.01)

(58) Field of Classification Search
CPC ......... H04N 21/43637; H04N 21/4402; H04N 21/44227; H04W 24/08
USPC ...................................................... 348/193
See application file for complete search history.

(56) References Cited

U.S. PATENT DOCUMENTS

| | | | |
|---|---|---|---|
| 2004/0132496 A1* | 7/2004 | Kim ............... | H04L 1/0009 455/562.1 |
| 2012/0076204 A1* | 3/2012 | Raveendran ....... | H04N 21/6131 375/240.12 |
| 2013/0223320 A1* | 8/2013 | Becker ............... | H04B 7/18582 370/312 |
| 2018/0102928 A1* | 4/2018 | Larsson ............ | H04L 1/0025 |
| 2018/0294919 A1* | 10/2018 | Cheng ............... | H04L 1/0083 |
| 2019/0028233 A1* | 1/2019 | Bontu ............... | H04L 1/0015 |

FOREIGN PATENT DOCUMENTS

KR 10-2015-0034808 A 4/2015

* cited by examiner

*Primary Examiner* — Michael Lee
(74) *Attorney, Agent, or Firm* — Rabin & Berdo, P.C.

(57) ABSTRACT

Disclosed is method of transmitting wireless variable AV according to channel environment, the AV format, code rate, and modulation index based on the lookup table according to the data rate. The modulation index, AV format, code rate, and output level may be adjusted step by step based on an SNR and/or a BER to provide a high quality image according to a channel environment.

5 Claims, 6 Drawing Sheets

| Operation AV format | Modulation | Code rate | Power control | Remark |
|---|---|---|---|---|
| 720p (30Hz/420) 0.518Gbps ① | BPSK ② | 1/2 5/8 2/3 ~ 13/16 5/6 7/8 ③ | High mid low<br>High mid low ④ | Lowest channel environment<br>Lowest AV format |
| 1080p (60Hz/444) 4.6656Gbps | QPSK | 1/2 5/8 2/3 ~ 13/16 5/6 7/8 | High mid low<br>High mid low<br>High mid low | |
| 2k (90Hz/444) 8.748Gbps | 16QAM | 1/2 5/8 2/3 ~ 13/16 5/6 7/8 | High mid<br>High mid low | |
| 4k (60Hz/444) 19.906Gbps | 64QAM | 1/2 5/8 2/3 ~ | High mid<br>High mid | Fixed AV regulation (source/sink highest quality support video)<br>Difficult to use due a source/sink support limit but assume available operation |

Deterioration ← → Improve

FIG. 6

METHOD OF TRANSMITTING WIRELESS VARIABLE AV ACCORDING TO CHANNEL ENVIRONMENT

BACKGROUND OF THE INVENTION

1. Field of the Invention

The present invention relates to a method of transmitting wireless variable AV (Audio/Video) according to the channel environment, and more specifically, a method of transmitting a seamless video without loss of image by varying an AV format using a look-up table (LUT) according to a channel environment.

2. Description of the Prior Art

Source devices such as smartphones, desktop PC or console, and display devices such as large display devices or HMD (Head Mounted Display) devices can be connected wirelessly so that users can enjoy video from the source devices on the display device. However, fading, shadowing, and attenuation according to a wireless channel environment such as noise, interference, or the like cause a black screen or a still picture without a signal occurs due to loss or disconnection of video data. These black screens or video breakup should be eliminated for immersive watching.

Conventionally, channel conditions are monitored to reduce loss of image data, and coding rate of image is adaptively varied corresponding to channel conditions.

A first communication section for transmitting a video stream and a second communication section for transmitting auxiliary data for monitoring channel conditions are formed between the source device and the display device. An auxiliary data is used for a process of monitoring a channel state and a process for matching an AV format between the source device and the display device. If the AV format between the source device and the display device does not match, the display device cannot play back the image of the source device.

Image breakdown may occur in the display device by adjusting and setting image quality according to a wireless channel while exchanging auxiliary data between the source device and the display device, and immersive watching may be reduced by the video breakdown In the prior art, in order to change the AV format, the video is interrupted to a black or still picture 3 to 10 seconds while resetting a source device and a sink device.

Conventionally, in order to remove black screen or still image phenomena when changing the AV format, a fixed communication part is placed near the source and the sink, and an image conversion part is provided before a wireless terminal so that a seamless video can be enjoyed even if the AV format is changed.

Accordingly, it is important to define an effective AV format between the source devices and sink devices to keep with changing channel environment to maintain image quality and to eliminate black-screen or break phenomenon.

SUMMARY OF THE INVENTION

To solve the above problems, the present invention provides an algorithm for adjusting data transmission rate by varying an AV format in conjunction with modulation coding using a lookup table (LUT) depending on a channel environment.

The present invention not only determines image quality level, but also supports stable performance of beam forming, diversity operation, and transmission output adjustment operation by using channel environment information.

A method for transmitting video by wireless transmission depending on a channel environment, preparing an LUT such as AV format, code rate and modulating index according to a data rate that can be obtained in a wireless channel environment; setting a modulation index based on an SNR; setting up an AV format; adjusting the modulating index and code rate; adjusting an output level; and changing an AV format depending on the channel environment.

The AV format may be a resolution, a refresh rate, a color depth and a color format.

The channel environment is measured with an SNR and a BER.

When the channel environment is improved above the SNR limit or below the BER limit, the modulation index and code rate are adjusted upward above a certain level, and accordingly, the AV format is changed to increase the data rate.

When the channel environment is deteriorated below the SNR limit or above the BER limit, the modulation index and code rate are adjusted downward, and accordingly, the AV format is changed to reduce the data rate.

When the channel environment is improved, a clearer AV format may be defined by reducing the code rate and adjusting the modulation index upward to increase the transmission data rate.

When the channel environment is deteriorated, the code rate is increased, the modulation index is adjusted downward, and the transmission data rate is decreased to set the AV format that can be specified within the transmission rate.

Effect of the Invention

The present invention generates a converted video by adjusting the quality level of the original video according to a channel environment information in the wireless AV transmitter, and by reconstructing the converted video in the format of the original video in the wireless AV receiver to generate a restored video, a display device can wirelessly play the video of a source device, even a display device that provides only a fixed AV format can play a restored video whose quality level is adjusted according to a channel state, and has a remarkable effect of preventing a video break in the display device.

In the prior art, when the channel environment is deteriorated, there is a problem that the output level is increased to cause interference in neighbor communication channels. However, the present invention can reduce the bandwidth by changing the AV format, so there is little interference in the neighbor channels.

Depending on the channel environment, the modulation index, code rate, and AV format may be changed for efficient dynamic range and operation that improves power efficiency.

The present invention not only determines image quality level, but also supports stable performance of beam forming, diversity operation, and transmission output adjustment operation by using channel environment information, thereby preventing image breakdown on a display device. It can stably perform beam forming and diversity operation, and has a remarkable effect of efficiently adjusting the transmission output.

DETAILED DESCRIPTION OF THE EXEMPLARY EMBODIMENTS

Hereinafter, embodiments of the present invention will be described in detail with reference to accompanying drawings and contents described in the accompanying drawings, but the present invention is not limited or limited to the embodiments.

Figure 1:
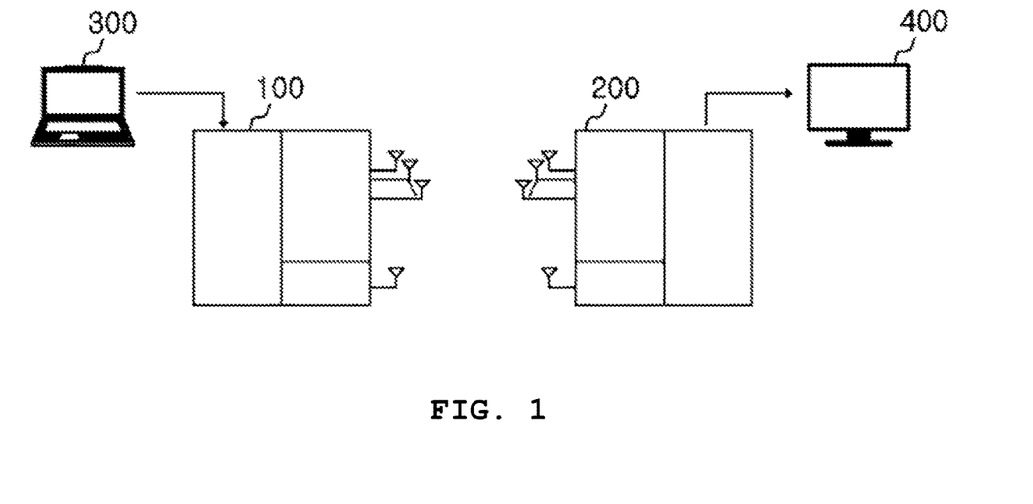
FIG. 1 is a block diagram illustrating a transmitting wireless variable AV apparatus according to an embodiment of the present invention.

FIG. 1 is a block diagram illustrating a wireless variable AV (Audio/Video) transmission apparatus according to an embodiment of the present invention, wherein the transmitting wireless variable AV apparatus comprises a wireless AV transmitter 100 for wirelessly transmitting a video of a source device 300 and a wireless AV receiver 200 for transmitting the received video to a display apparatus 400. The wireless AV transmitter and the wireless AV receiver are connected to the source device and the display device, respectively, so that the display device can wirelessly reproduce the image of the source device.

The wireless AV transmitter 100 includes a transmitting AV processing control part and a wireless transmitting part.

The transmission AV processing control part receives an original AV of the source device 300 and convert AV in one of format sets as an example as shown in Table 1. The original AV is an optimal high quality image or an image of a format supported by the source device 300 or the display device 400. The converted image is a deteriorated image whose quality level is adjusted, and is a quality level image corresponding to a channel environment.

TABLE 1

| | | AV format | | | |
|---|---|---|---|---|---|
| index | resolution | refresh freq(Hz) | bit | color format (YCbCr) | color depth |
| 1 | 4k | 60 | 36 | 4:4:4 | 30 |
| 2 | 4k | 30 | 30 | 4:4:4 | 30 |
| 3 | FHD | 60 | 39 | 4:4:4 | 30 |
| 4 | 720 | 30 | 30 | 4:2:0 | 36 |

In addition, the transmission AV processing control part may control a modulation index, a code rate, an output level, beam forming, and the like as shown in Table 2.

TABLE 2

| | MCS | | | |
|---|---|---|---|---|
| Index | Modulation | code rate | power level | beam forming beam table |
| 1 | 64QAM | 1/2 | high | −30° |
| 2 | 16QAM | 5/8 | mid | −20° |
| 3 | QPSK | 2/3 | low | −10° |
| 4 | BPSK | 3/4 | | 0° |
| 5 | | 13/16 | | +10° |
| 6 | | 5/6 | | +20° |
| 7 | | 7/8 | | +30° |

The wireless transmission part includes a first low speed communication part for transmitting and receiving auxiliary data such as control data and a first high speed communication part for transmitting an image. The baseband signal is loaded on a carrier and converted into an RF signal for wireless transmission.

The first high speed communication part wirelessly transmits the original image or the converted image using a millimeter wave or terahertz wave, and the first low speed communication part receives the channel environment information from the second low speed communication part of the wireless AV receiver or the wireless AV transmitter.

The transmission AV processing control part determines whether the AV format and the variable operation are operated by comparing the channel state measurement value included in the channel environment information with a reference value according to the channel state.

The AV format is set by adjusting one or more of a resolution, refresh rate, color depth, and color format of the original image. The resolution is an indication of how many pixels are included in a screen, and is generally expressed as a product of the number of pixels in the horizontal and the number of pixels in the vertical. For example, the resolution is divided into 1280×720 for HD, 1920×1080 for FHD, 3840×2160 for 4 k, and 7680×4320 for 8 k. The refresh rate is the number of full screen shots sent in one second. For example, a refresh rate of 60 Hz means 60 full screen shots per second. Color depth expresses the number of colors by the number of bits. For example, if each of RGB is 8 bits, the color depth is 24 bits. Color format refers to the detection, presentation and display of images in electronic systems such as televisions and computers. Color formats are divided into the most basic RGB format and YUV format specialized for a specific analog or digital TV or photographic equipment.

The transmission AV processing control part determines whether one or more of modulation index, code rate, AV format variable adjustment, beam forming and diversity operation, and transmission output adjustment operation are operated according to the channel environment BER and SNR. The reference value includes a first reference value that is a reference for transmission of an original image, a second reference value that is a reference for transmission of a converted image, and a third reference value that is a reference for performing beam forming and diversity operations. The first reference value is greater than the second reference value and the third reference value, and the second reference value includes quality reference values for each level divided into multi-level quality levels, and the third reference value includes a lower quality reference value from the second reference value.

If a channel measurement value is equal to or larger than the first reference value, the transmission AV processing control part controls the original image to be wirelessly transmitted and determine the quality level. If a channel measurement value is smaller than the third reference value, the AV processing control part performs beam forming and diversity operations. The AV processing control part generates control information including channel search request information when it is determined to perform beam forming and diversity operations, and the first low-speed communication part wirelessly transmits the control information.

A first reference value to a third reference value are values that are reference for the step-by-step transmission output adjustment. The AV processing control part controls to maintain the transmission power at low power when the channel state measurement value is equal to or greater than the first reference value, and controls the transmission output at high power when the state measurement value is included in the second reference value. If the measurement value is less than the third reference value, control is made to adjust the transmit power with ultra-high power. The AV processing control part may operate by further subdividing the steps to adjust the level of the transmission output for power efficiency.

The transmission AV processing control part controls an AV format adjustment operation suitable for a channel state after a beam forming and diversity operation. According to the present invention, the beam forming and the diversity operation are controlled to be operated after the AV format adjustment operation, and thus, the display device 400 can seamlessly play back the image by adjusting to the AV format optimized for the wireless environment.

The transmission AV processing control part controls a high quality original image transmission when a channel state corresponding to a first reference value is improved by beam forming and diversity operation, and performs a transmission output adjustment operation, and then the high quality original image transmission is operated. Transmission power can be controlled stably.

According to the present invention, a reference image may be divided into first reference values to third reference values so as to generate a converted image with a multi-level quality. Additionally, by defining an AV image format suitable for an optimal channel environment obtained after performing beam forming, diversity operation, and transmission output adjustment operation, it may be possible to prevent image breakdown in a display device 400.

A wireless AV receiver 200 includes a receiving AV processing control part and a wireless receiving part. The wireless receiving part includes a second high speed communication part for receiving an image and a second low speed communication part for transmitting and receiving auxiliary data such as control data.

The receiving AV processing control part controls beam forming and diversity operations when a channel measurement value is smaller than the reference value. The transmission AV processing control part generates control information including channel search request information when it is determined to perform beam forming and diversity operations, and the second low speed communication part wirelessly transmits the control information.

The receiving AV processing control part generates channel environment information based on a signal to noise ratio (SNR) of the image received from the second high speed communication part, a bit error rate (BER), a received signal strength (RSSI), and the like. The second low speed communication part wirelessly transmits the channel environment information to the first low speed communication part. The channel environment information of the present invention may be an SNR and a BER.

The receiving AV processing control part controls to transmit one of an original image, a reconstructed image, and a still image stored in a memory to a display device in response to a channel environment.

The high speed communication part included in each of the wireless AV transmitter 100 and the wireless AV receiver 200 of FIG. 1 transmits a large amount of image data, minimizes loss of image data. An antenna performs multiplexing for beam forming and diversity operation.

The low speed communication part included in each of the wireless AV transmitter 100 and the wireless AV receiver 200 is provided with a single antenna for transmitting small amount of information such as sharing channel environment information, transmitting AV format information, or transmitting channel search request information. The transmitting wireless variable AV apparatus may perform diversity for each antenna according to a channel state, and perform beam forming for each beam direction of the antenna as shown in Table 2.

Generally, image breakdown may occur in a display device by adjusting and setting image quality according to a wireless channel while exchanging auxiliary data between a source device and a display device, and immersive watching of a user may be disturbed by image breakdown. For example, when a display device changes and sets an AV format, a switching section occurs causing an image to be broken.

A transmitting wireless variable AV method according to a channel environment of the present invention is as follows.
1. Preparing an AV format, code rate, and modulation index according to a channel environment as a LUT (lookup table) of data rate or bandwidth.

AV format, code rate, and modulation index are prepared as a LUT according to data rate or band width and adjusted according to LUT condition according to the channel environment. The channel environment may use values measured by an SNR and a BER in the receiving AV processing control part.

Figure 2:
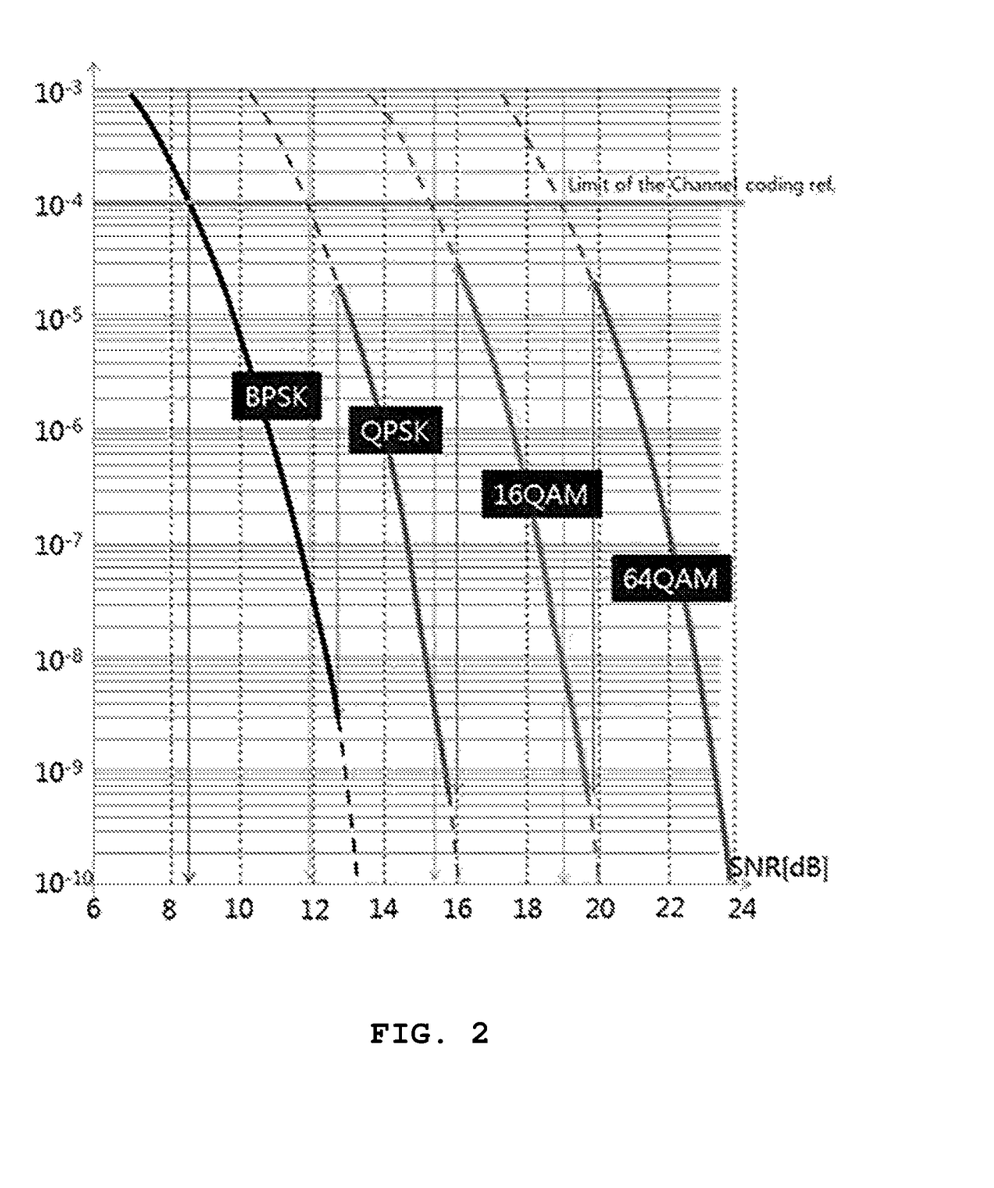
FIG. 2 is an example of adjusting a modulating index according to an SNR within a BER limit.

2. Setting modulation index based on a SNR
As shown in FIG. 2, a modulation index is adjusted according to a signal to noise ratio (SNR) within a bit error rate (BER) limit. For example, when a BER is set to $10^{-4}$ or less, a modulation index is set to 64QAM if a SNR is 20 dB or more, 16QAM if 16 dB or more, QPSK if 13 dB or more, and BPSK above 9 dB.

3. Adjusting AV Format
An LUT sets AV formats that are suitable AV formats comprising resolutions, refresh rates, color depths, and color formats as shown in Table 1 at a modulation index and code rate. When adjusting the AV format, set the code rate and output power level to the maximum, and then change the AV format so that stable AV format adjustment can be made, and then adjust the optimum output power level.

4. Adjusting Code Rate
When a channel environment improves, a modulation index is increased when the minimum code rate is reached while reducing the code rate. Code rates are adjusted to 1/2, 5/8, 2/3, 3/4, 13/16, 5/6, and 7/8. After the modulation index is increased, the AV format is adjusted upward and output power level is controlled.

5. Adjusting Output Power Level
When a channel environment is improved, a transmission output power level is adjusted to maintain the transmission output at a low power, and when the channel environment is deteriorated, the transmission output power level is controlled at a high power. The AV processing control part may operate by further subdividing the steps to adjust the power level of the transmission output for power efficiency.

Figure 3A:
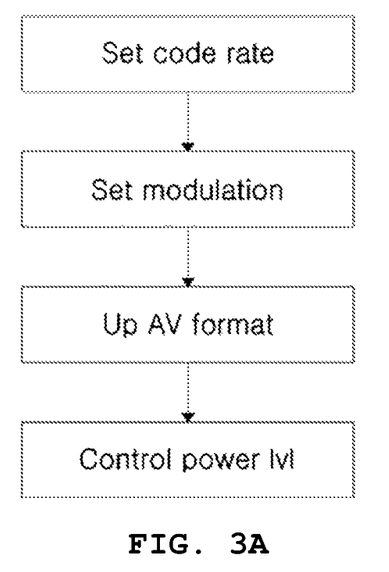
FIG. 3A is a flowchart illustrating a case where a channel environment is improved after beam forming and diversity operations.

FIG. 3A is a flowchart illustrating a case where a channel environment is improved after beam forming and diversity operation. A code rate and modulation index are adjusted upward, an AV format of the LUT suitable for the adjusted condition, and optimized power is controlled.

Figure 3B:
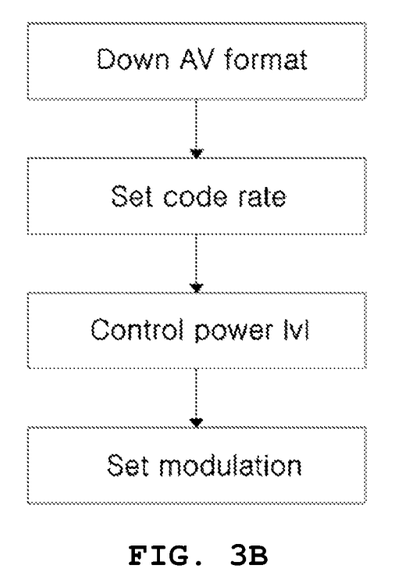
FIG. 3B is a flowchart illustrating a case where a channel environment is deteriorated after beam forming and diversity operations.

FIG. 3B is a flowchart of a case where a channel environment deteriorates after beam forming and diversity operation. An AV format is reduced in order to reduce the data rate, to achieve an optimal code rate and output level, and to exceed a BER limit down.

Figure 4:
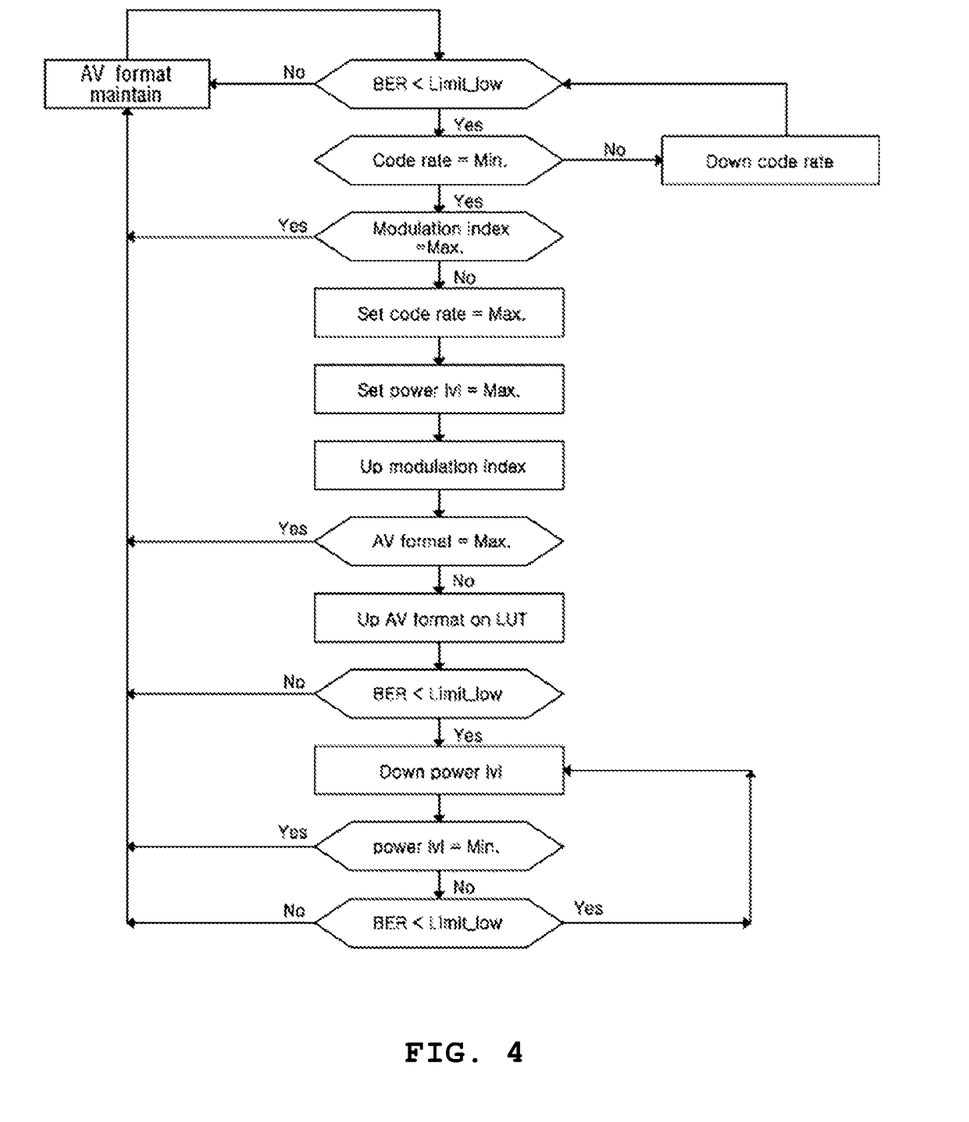
FIG. 4 is a detailed operational flowchart of an AV format, modulation index, code rate, and output level when a channel environment is improved.

FIG. 4 is a flowchart illustrating a detailed operation of an AV format, a modulation index, a code rate, and an output power level when a channel environment is improved.

If a channel environment is improved above an SNR limit or below a BER limit, a code rate and a modulation index are adjusted upward. The AV format is changed to increase the data rate and output level control.

To ensure safe operation before adjusting the modulation index, a code rate and output level set to the maximum and then change a modulation index and AV format upward to allow stable modulation index and AV format adjustment.

Increasing the AV format and modulation index or increasing the data rate allows a BER to be adjusted over a certain time period so that a safe change is made in a stable channel environment.

Figure 5:
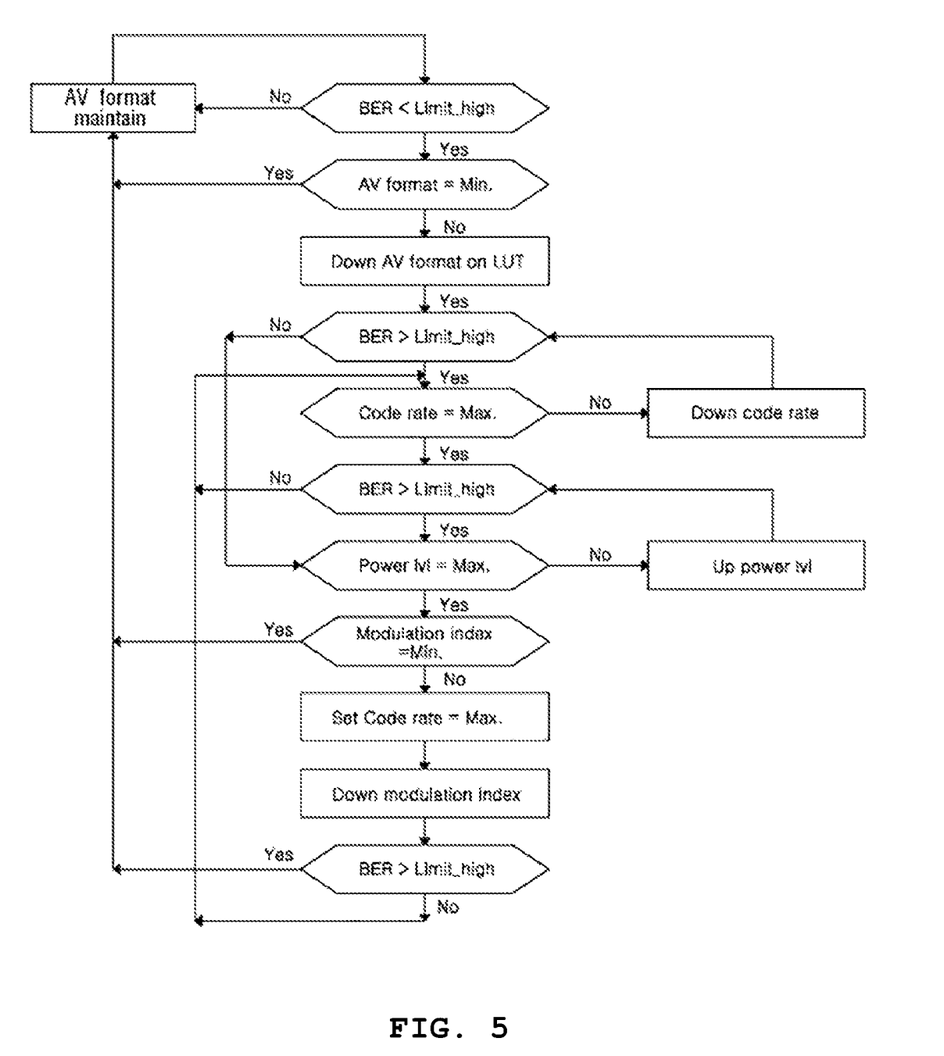
FIG. 5 is a detailed operational flowchart of an AV format, modulation index, code rate, and output level in the event of worsening channel environment.

FIG. 5 is a detailed operation flowchart of an AV format, a modulation index, a code rate, and an output level when a channel environment deteriorates. If an SNR and/or BER deteriorate above a certain level, an AV format is adjusted downward as shown in FIG. 5, and the modulation index is adjusted downward while adjusting to an optimal code rate and output level.

Before adjusting a modulation index downward, an output level and a code rate set to the maximum and then change the modulation index downward to allow stable modulation index adjustment. Then, adjust the code rate and output level to the optimum.

The conditions for lowering the AV format, modulation index, a code rate and output level are immediately adjusted under conditions that determine that a BER is out of the limit.

Figure 6:
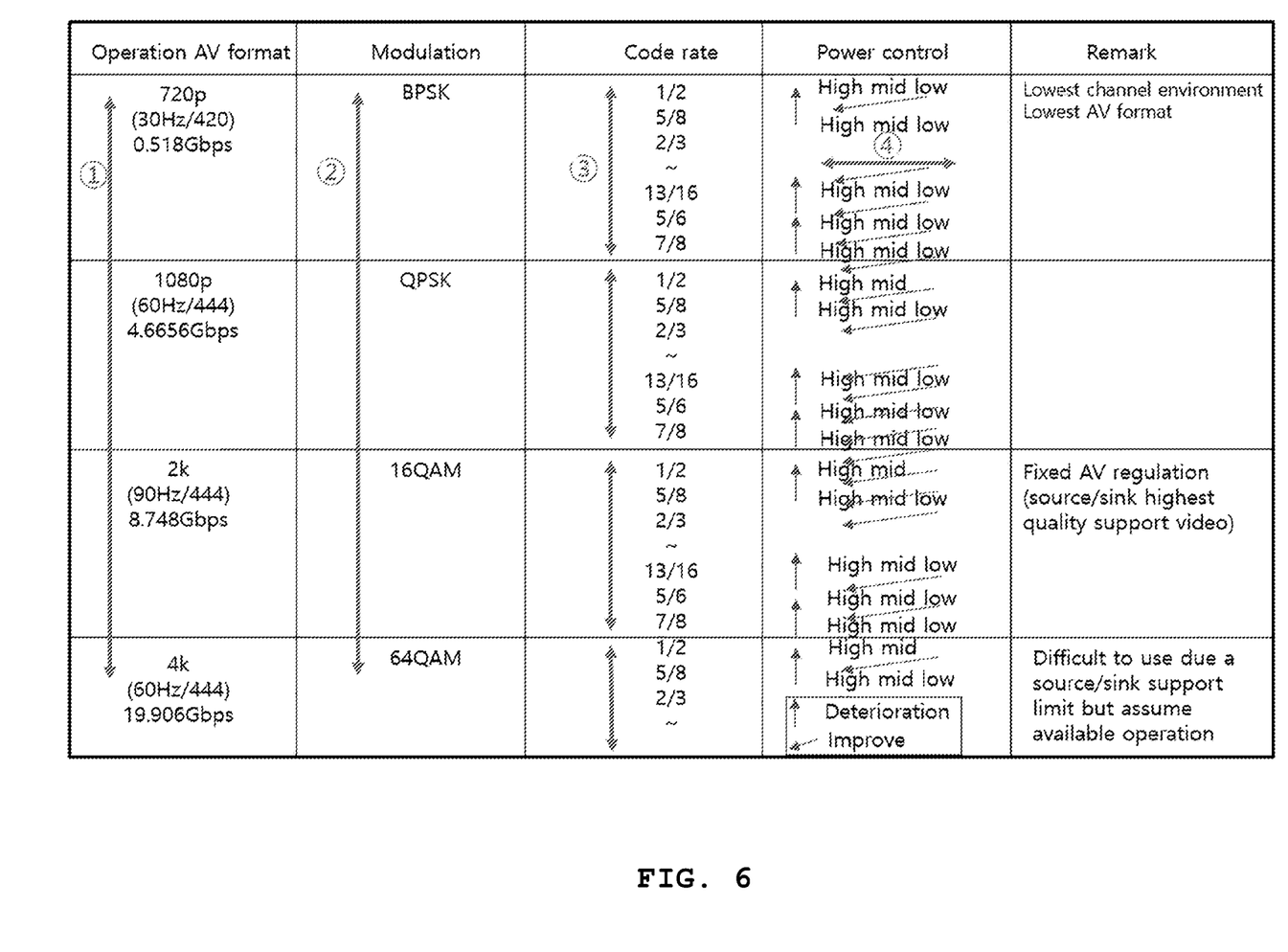
FIG. 6 is an example of performing an operation directions sequence according to an algorithm in the LUT.

FIG. 6 illustrates an example of performing an operation direction sequence according to an algorithm in the LUT. When a transmitting wireless variable AV apparatus is on or reset, it finds channels, performs beam forming and diversity operations, and defines the high quality AV formats available for sources and sinks. An AV format is defined and changed according to a channel environment.

A modulation index is determined according to an AV format, and a code rate and output level are adjusted when a channel environment changes. When the channel environment is improved, the output level is adjusted from high to low power, but when the code rate is lowered, the output level is adjusted from low power to high power.

An AV format starts with mid power for the first time. When a channel environment deteriorates, the code rate is adjusted upward while the output level operates from high power to high power.

What is claimed is:

1. A method of transmitting wireless variable AV from a source device to a display device according to a channel environment comprising steps of:
    preparing a lookup table (LUT) comprising an AV format, a code rate, and a modulation index according to a data rate;
    setting a modulation index based on an SNR;
    setting an AV format;
    adjusting a code rate;
    adjusting an output level, and
    changing an AV format according to a channel environment,
    wherein the channel environment is measured with an SNR and a BER, and
    when the channel environment is improved above the SNR limit or below the BER limit, the code rate and modulation index are adjusted upward, and the AV format is changed to increase the data rate and to control the output level.

2. A method of transmitting wireless variable AV from a source device to a display device according to a channel environment comprising steps of:
    preparing a lookup table (LUT) comprising an AV format, a code rate, and a modulation index according to a data rate;
    setting a modulation index based on an SNR;
    setting an AV format;
    adjusting a code rate;
    adjusting an output level, and
    changing an AV format according to a channel environment,
    wherein the channel environment is measured with an SNR and a BER, and
    when the channel environment deteriorates below the SNR limit or above the BER limit, the AV format is change to reduce the data rate, adjust the code rate and output level, and adjust the modulation index downward to reach the maximum value.

3. The method of claim 1, only when the channel environment is maintained for a certain time, the AV format, modulation index, code rate, and output level are adjusted upward.

4. The method of claim 2, when the channel environment changes, the AV format, modulation index, code rate, and output level are immediately adjusted.

5. The method according to claim 1, when the AV format and the modulation index is adjusted up or down, the code rate or output level is adjusted to the maximum, and then the AV format and modulation index is adjusted up or down.

* * * * *